US012694264B2

(12) United States Patent
Hong et al.

(10) Patent No.: US 12,694,264 B2
(45) Date of Patent: Jul. 28, 2026

(54) DATA PROCESSING METHOD AND COMPUTING SYSTEM FOR DISTRIBUTED REDUCTION ACROSS MULTIPLE DIES

(71) Applicant: Shanghai Biren Technology Co., Ltd, Shanghai (CN)

(72) Inventors: Zhou Hong, Shanghai (CN); Lingjie Xu, Shanghai (CN); Chengkun Sun, Shanghai (CN); Hao Shu, Shanghai (CN); Lin Chen, Shanghai (CN); Wei Liang, Shanghai (CN); Chao Meng, Shanghai (CN)

(73) Assignee: Shanghai Biren Technology Co., Ltd., Shanghai (CN)

( * ) Notice: Subject to any disclaimer, the term of this patent is extended or adjusted under 35 U.S.C. 154(b) by 944 days.

(21) Appl. No.: 17/968,809

(22) Filed: Oct. 19, 2022

(65) Prior Publication Data

US 2023/0125700 A1     Apr. 27, 2023

(30) Foreign Application Priority Data

Oct. 26, 2021    (CN) .......................... 202111245073.3

(51) Int. Cl.
| | |
|---|---|
| *G06N 3/063* | (2023.01) |
| *G06N 3/04* | (2023.01) |
| *G06N 3/049* | (2023.01) |
| *G06N 3/08* | (2023.01) |
| *G06N 3/084* | (2023.01) |

(52) U.S. Cl.
CPC ..................................... *G06N 3/04* (2013.01)

(58) Field of Classification Search
CPC .......... G06N 3/04; G06N 3/063; G06N 3/045; G06F 15/161
See application file for complete search history.

(56) References Cited

U.S. PATENT DOCUMENTS

| | | | | |
|---|---|---|---|---|
| 11,321,606 | B2 * | 5/2022 | Sharma | .................... G06N 3/10 |
| 11,354,573 | B2 * | 6/2022 | Venkataramani | ...... G06N 3/084 |
| 2006/0109943 | A1 * | 5/2006 | Nguyen | ................ G06F 1/3203 |
| | | | | 713/600 |
| 2012/0166845 | A1 * | 6/2012 | Henry | ................... G06F 9/5094 |
| | | | | 713/323 |
| 2016/0179177 | A1 * | 6/2016 | Henry | ................. G06F 9/44505 |
| | | | | 713/320 |

(Continued)

*Primary Examiner* — Brandon S Cole
(74) *Attorney, Agent, or Firm* — JCIP GLOBAL INC.

(57) ABSTRACT

The embodiments of the disclosure relate to a data processing method and a computing system. For each die: a first reduction engine of multiple reduction engines corresponding to multiple computing cores included in a current die is determined; each computing core sends data to be reduced and a synchronization indicator to the first reduction engines in multiple dies; in response to receiving the data to be reduced and the synchronization indicators from the computing cores in multiple dies, the first reduction engine in the current die performs a reduction operation on the data to be reduced to generate a reduction computing result, and sends synchronization acknowledgments to the computing cores in the current die; and in response to receiving the synchronization acknowledgment, each computing core in the current die reads the reduction computing result from the first reduction engine in the current die.

8 Claims, 7 Drawing Sheets

100

(56) References Cited

U.S. PATENT DOCUMENTS

| | | | |
|---|---|---|---|
| 2016/0283314 A1* | 9/2016 | Thanner | G06F 11/0793 |
| 2019/0325305 A1* | 10/2019 | Zhang | G06N 3/0464 |
| 2023/0112522 A1* | 4/2023 | Minkel | G16H 20/00 |
| | | | 705/2 |

* cited by examiner

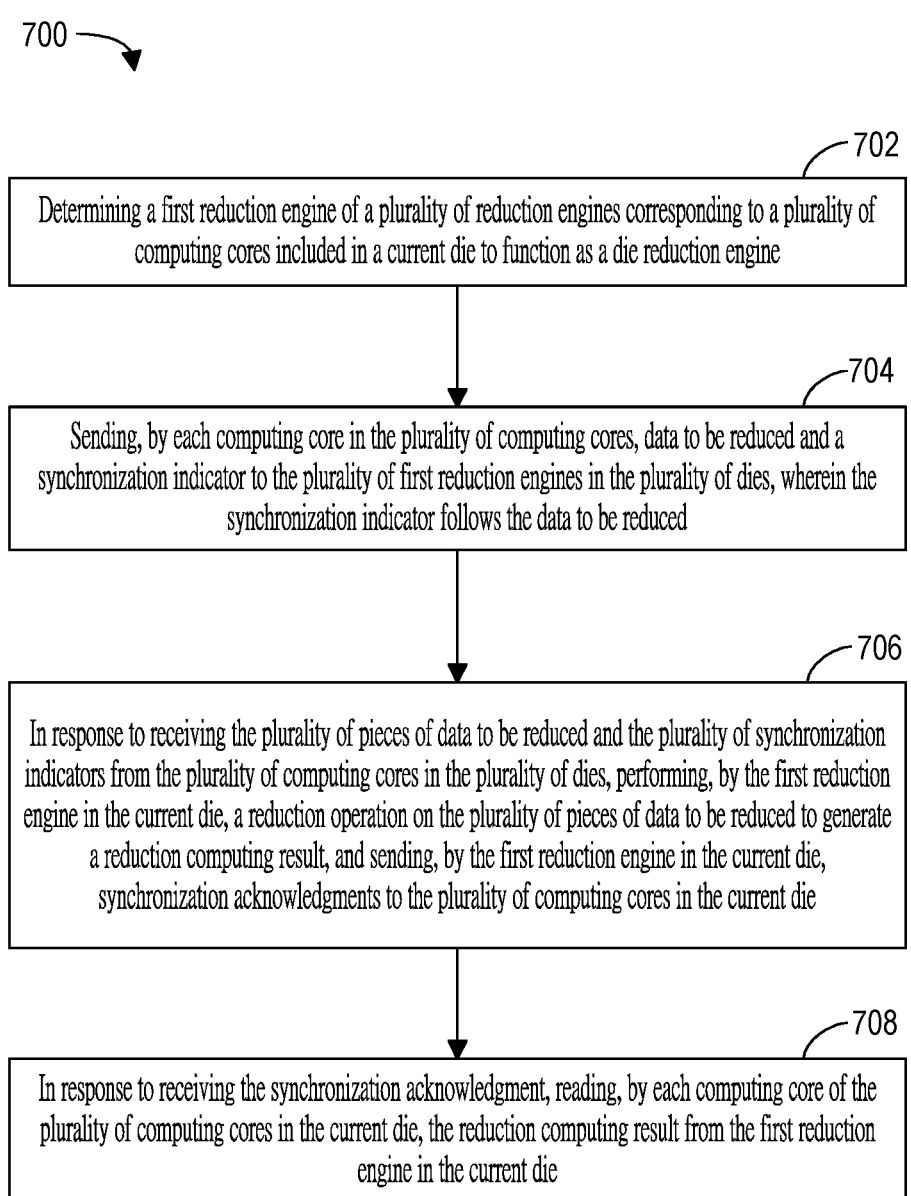

700

702

Determining a first reduction engine of a plurality of reduction engines corresponding to a plurality of computing cores included in a current die to function as a die reduction engine

704

Sending, by each computing core in the plurality of computing cores, data to be reduced and a synchronization indicator to the plurality of first reduction engines in the plurality of dies, wherein the synchronization indicator follows the data to be reduced

706

In response to receiving the plurality of pieces of data to be reduced and the plurality of synchronization indicators from the plurality of computing cores in the plurality of dies, performing, by the first reduction engine in the current die, a reduction operation on the plurality of pieces of data to be reduced to generate a reduction computing result, and sending, by the first reduction engine in the current die, synchronization acknowledgments to the plurality of computing cores in the current die

708

In response to receiving the synchronization acknowledgment, reading, by each computing core of the plurality of computing cores in the current die, the reduction computing result from the first reduction engine in the current die

FIG. 7

DATA PROCESSING METHOD AND COMPUTING SYSTEM FOR DISTRIBUTED REDUCTION ACROSS MULTIPLE DIES

CROSS-REFERENCE TO RELATED APPLICATION

This application claims the priority benefit of China application serial no. 202111245073.3, filed on Oct. 26, 2021. The entirety of the above-mentioned patent application is hereby incorporated by reference herein and made a part of this specification.

BACKGROUND

Technical Field

The embodiments of the disclosure generally relate to the field of information processing, and in particular, relates to a data processing method and a computing system.

Description of Related Art

In a multiple-computing core, multiple-die, and even multiple-computing device (e.g., chip) computing system, batches of deep learning tasks are divided and processed in parallel among the multiple-computing core, multiple-die, an even the multiple-computing devices. In each iteration of the deep neural network, the input data is divided into multiple parts, and then the forward propagation and backward propagation operations are independently performed in multiple computing cores, multiple dies, and even multiple computing devices to calculate the gradients. After this iteration is completed, the gradients are merged and the parameters of the deep neural network are updated, and then the next iteration is performed.

A deep neural network includes multiple hidden layers. During the training process, the parameters of each hidden layer keep changing, causing the input distribution of each layer to change, so that the input distribution of each layer no longer satisfies the independent and identically distribution (IID) assumption, which is the so-called internal covariate shift (ICS) problem. In order to solve the ICS problem, batch normalization (BN, also known as batch standardization) is proposed, that is, through a certain normalization method, the mean of the input distribution of each layer of the neural network is 0 and the variance is 1.

While ICS is improving, batch normalization also brings huge challenges. This is because if synchronization and normalization are performed in a remote die or even in a computing core in a remote computing device, high synchronization overhead and long delay due to the transmission of synchronization information and data back and forth can cause serious performance problems.

In the conventional solution, a global synchronization unit and a global reduction engine are provided. All computing cores in all dies or in all computing devices send synchronization indicators to the global synchronization unit and data to be reduced for reduction processing in the programmed global reduction engine. Generally, each participating computing core performs the following steps for batch normalization: 1) write out normalized data for reduction; 2) refreshes the data out; 3) sends a synchronization indicator to the global synchronization unit; 4) the global synchronization unit performs synchronization and performs synchronization acknowledgment on the computing core; 5) reads back the reduced data; and 6) performs data normalization.

It thus can be seen, data refreshing, synchronization, and data reading may occur at remote ends across dies or across devices, and these operations create three times the long delay across dies and even across devices. This will greatly affect overall performance. As shown in FIG. 1, if a global synchronization unit 110 is located in a computing device 1, and the global reduction operation is performed in a reduction engine 120 in a computing core 1 in a die 1 in the computing device 1, for the computing core in a die 2 in a computing device 2, the delay is quite long. This is because it will physically span multiple dies and multiple computing devices for refreshing, synchronization, and data reading/writing.

SUMMARY

The disclosure provides a data processing method and a computing system capable of reducing reduction data processing delay across dies.

According to the first aspect of the disclosure, the disclosure provides a data processing method. The data processing method includes: for each die in a plurality of dies, the following steps are performed. A first reduction engine of a plurality of reduction engines corresponding to a plurality of computing cores included in a current die is determined to function as a die reduction engine. Each computing core in the plurality of computing cores sends data to be reduced and a synchronization indicator to the plurality of first reduction engines in the plurality of dies. The synchronization indicator follows the data to be reduced. In response to receiving the plurality of pieces of data to be reduced and the plurality of synchronization indicators from the plurality of computing cores in the plurality of dies, the first reduction engine in the current die performs a reduction operation on the plurality of pieces of data to be reduced to generate a reduction computing result and sends synchronization acknowledgments to the plurality of computing cores in the current die. In response to receiving the synchronization acknowledgment from the first reduction engine in the current die, each computing core of the plurality of computing cores in the current die reads the reduction computing result from the first reduction engine in the current die.

According to the second aspect of the disclosure, the disclosure further provides a computing system. The computing system includes a plurality of dies. Each of the plurality of dies includes a plurality of computing cores, each computing core of the plurality of computing cores includes a reduction engine, and in each die of the plurality of dies, the following is performed. A first reduction engine of the plurality of reduction engines corresponding to the plurality of computing cores is configured to function as a die reduction engine. Each computing core in the plurality of computing cores is configured to send data to be reduced and a synchronization indicator to the plurality of first reduction engines in the plurality of dies, where the synchronization indicator follows the data to be reduced. In response to receiving the plurality of pieces of data to be reduced and the plurality of synchronization indicators from the plurality of computing cores in the plurality of dies, the first reduction engine in the current die is configured to perform a reduction operation on the plurality of pieces of data to be reduced to generate a reduction computing result and sends synchronization acknowledgments to the plurality of computing cores in the current die. In response to receiving the synchronization acknowledgment from the first reduction engine in the current die, each computing core of the plurality of computing cores in the current die is further configured to read the reduction computing result from the first reduction engine in the current die.

According to the third aspect of the disclosure, the disclosure further provides a computer-readable storage medium on which a computer program is stored. When the program is executed by a computer, the method described in the first aspect of the disclosure is implemented.

It should be understood that the content described in this section is not intended to identify key or important features of the embodiments of the disclosure, nor is it intended to limit the scope of the disclosure. Other features of the disclosure will be easily understood through the following description.

BRIEF DESCRIPTION OF THE DRAWINGS

The abovementioned and other features, advantages and aspects of the various embodiments of the disclosure will become more apparent in combination with the accompanying drawings and with reference to the following detailed description. In the drawings, the same or similar reference numbers refer to the same or similar elements.

FIG. 7 is a flow chart of a data processing method 700 according to an embodiment of the disclosure.

DESCRIPTION OF THE EMBODIMENTS

Figure 1:
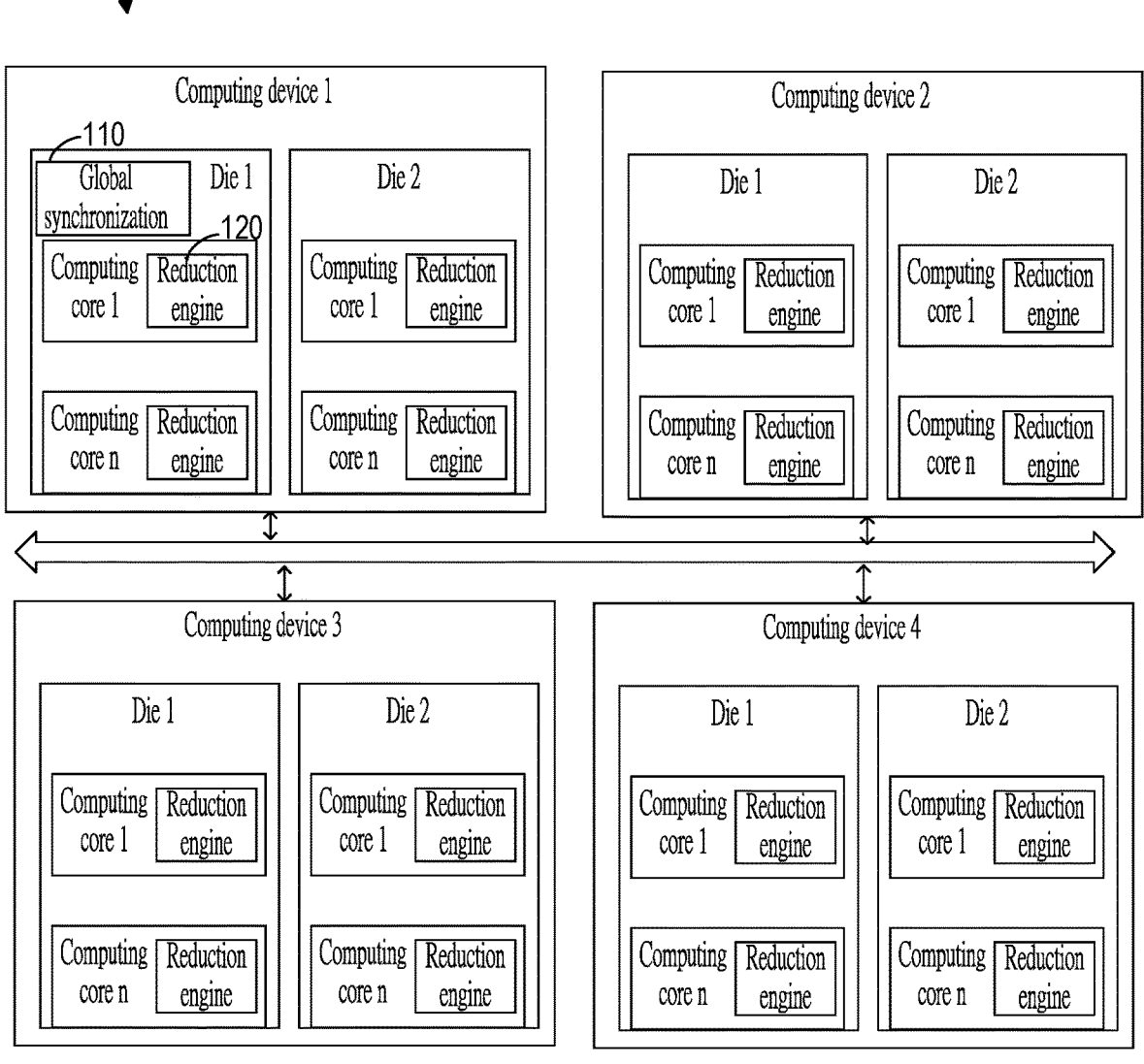
FIG. 1 is a schematic diagram of a computing system 100 according to the related art.

The exemplary embodiments of the disclosure will be described below with reference to the accompanying drawings. Various details of the embodiments of the disclosure are included to facilitate understanding, but they should be regarded as merely exemplary. Therefore, a person having ordinary skill in the art should realize that various changes and modifications may be made to the embodiments described herein without departing from the scope and spirit of the disclosure. Likewise, for clarity and conciseness, description of commonly-known functions and structures are omitted in the following description.

The term "including" and its variants used in the specification means open-ended inclusion, that is, "including but not limited to". Unless specifically stated, the term "or" means "and/or". The term "based on" means "based at least in part on." The terms "one exemplary embodiment" and "one embodiment" mean "at least one exemplary embodiment". The term "another embodiment" means "at least one additional embodiment". The terms "first", "second", etc. may refer to different or the same objects. The following may also include other explicit and implicit definitions.

As described above, when data refreshing, synchronization, and data reading occur at remote ends across dies or across devices, the conventional solution creates three times the long delay across dies and even across devices. This will greatly affect overall performance.

To at least partially address one or more of the above-mentioned problems and other potential problems, exemplary embodiments of the disclosure provide a solution for data processing. In the solution, for each die in a plurality of dies, the following steps are performed. A first reduction engine of a plurality of reduction engines corresponding to a plurality of computing cores included in a current die is determined to function as a die reduction engine. Each computing core in the plurality of computing cores sends data to be reduced and a synchronization indicator to the plurality of first reduction engines in the plurality of dies. The synchronization indicator follows the data to be reduced. In response to receiving the plurality of pieces of data to be reduced and the plurality of synchronization indicators from the plurality of computing cores in the plurality of dies, the first reduction engine in the current die performs a reduction operation on the plurality of pieces of data to be reduced to generate a reduction computing result and sends synchronization acknowledgments to the plurality of computing cores in the current die. In response to receiving the synchronization acknowledgment from the first reduction engine in the current die, each computing core of the plurality of computing cores in the current die reads the reduction computing result from the first reduction engine in the current die. In this way, the reduction data processing delay across dies may be reduced.

Hereinafter, specific examples of the solution are to be described in detail with reference to the accompanying drawings.

Figure 2:
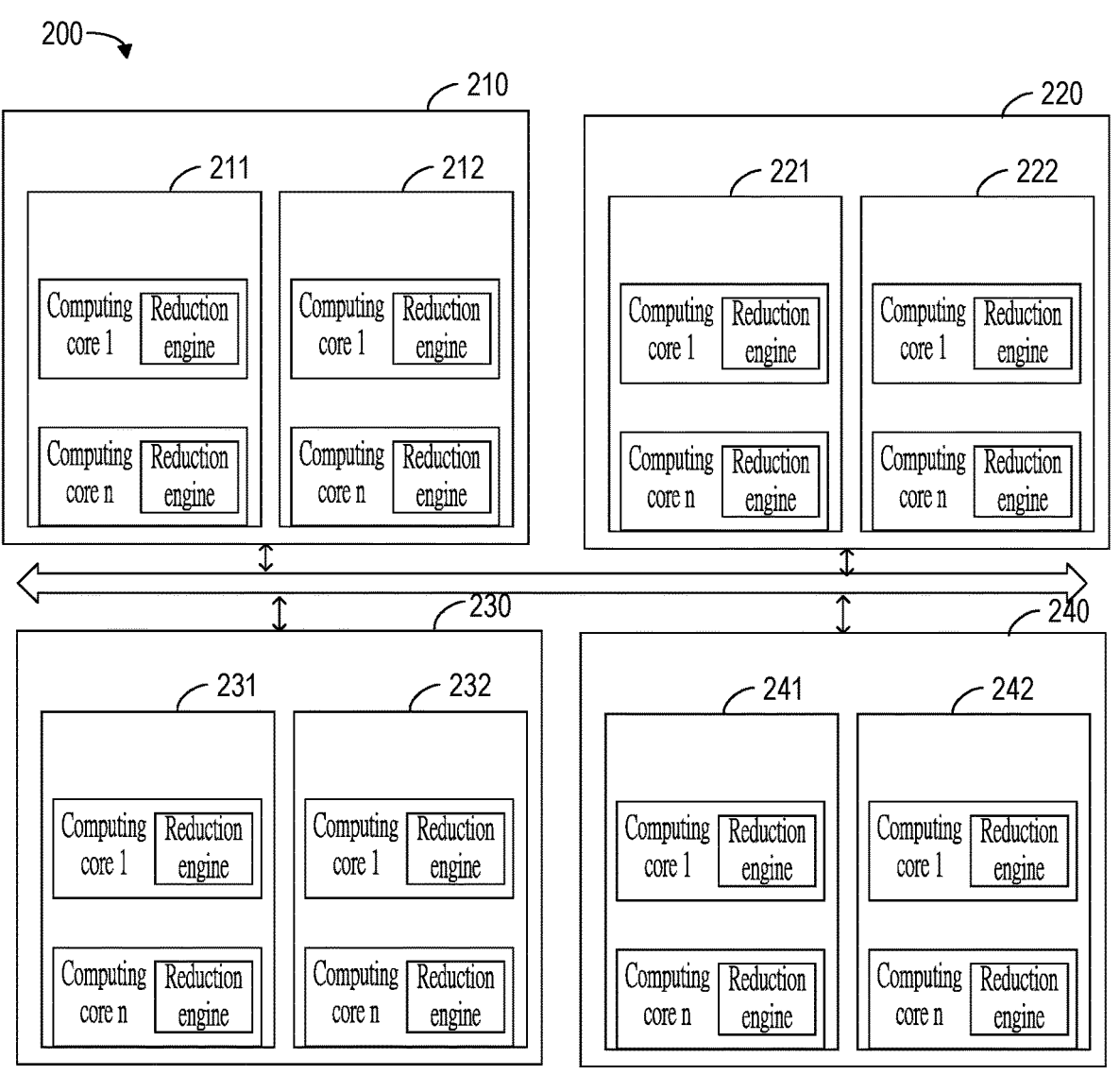
FIG. 2 is a schematic diagram of a computing system 200 according to an embodiment of the disclosure.

FIG. 2 illustrates a schematic diagram of an example of a computing system 200 according to an embodiment of the disclosure. As shown in FIG. 2, the computing system 200 may include four computing devices 210, 220, 230, and 240. It should be understood that although 4 computing devices are shown in FIG. 2, this is for illustration only, and the computing system 200 may include more or fewer computing devices, such as 1, 2, 3, and 5 computing devices, and so on.

Each of the computing devices 210 to 240 may include a plurality of dies. As shown in FIG. 2, the computing device 210 includes 2 dies 211 and 212, the computing device 220 includes 2 dies 221 and 222, the computing device 230 includes 2 dies 231 and 232, and the computing device 240 includes 2 dies 241 and 242. It should be understood that although FIG. 2 shows that each computing device includes 2 dies, this is for illustration only, and each computing device may include more dies.

The computing devices 210 to 240 include but not limited to, for example, chips packaged with a plurality of dies, such as central processing unit chips (CPU chips), graphics processor chips (GPU chips), artificial intelligence chips (AI chips), high-performance computing chips (HPC chips), and the like. The plurality of dies in each computing device may be connected through a high-speed I/O bus to be connected to a network on chip (NOC) within each die. The computing devices may be connected through an inter-chip interconnection technology, such as Blink or a high-speed I/O bus.

Each die may include a plurality of computing cores. Each computing core may be configured to perform one or more general or custom operations. For instance, each computing core may be configured to perform logical, logarithmic, exponential, multiplication, comparison, trigonometric, matrix operations, and/or other suitable general-purpose operations. Alternatively or additionally, each computing core may be configured to perform neural network model training and inference, phylogenetic inference, genome sequencing, climate modeling, weather forecasting, video/sound processing, and/or other suitable custom operations. The computing cores may include reduction engines (also referred to as reduction computing units). The reduction engines may be configured to perform reduction operations including but not limited to addition, multiplication, etc., for example.

As shown in FIG. 2, the dies 211, 212, 221, 222, 231, 232, 241, and 242 each include n computing cores, where n is greater than or equal to 2. It should be understood that although FIG. 2 shows that the dies have the same number of computing cores, this is for illustration only, and different dies may have different numbers of computing cores.

For each die, a first reduction engine (e.g., the reduction engine in a computing core 1) of the plurality of reduction engines corresponding to the plurality of computing cores may be configured to function as a die reduction engine. Each computing core of the plurality of compute cores (e.g., the computing core 1 to a computing core n) may be configured to send data to be reduced and a synchronization indicator to the plurality of first reduction engines (e.g., the reduction engines in the computing cores 1 in the dies 211, 212, 221, 222, 231, 232, 241, and 242) in the plurality of dies (e.g., the dies 211, 212, 221, 222, 231, 232, 241, and 242). The synchronization indicator follows the data to be reduced. The plurality of dies herein may be located in one or more computing devices. For instance, where the computing system 200 includes one computing device, the plurality of the dies herein may be located in one computing device. For instance, where the computing system 200 includes multiple computing devices, the plurality of dies herein may be located in the multiple computing devices. The data to be reduced may be used, for example, for batch normalization of a neural network model.

Figure 3:
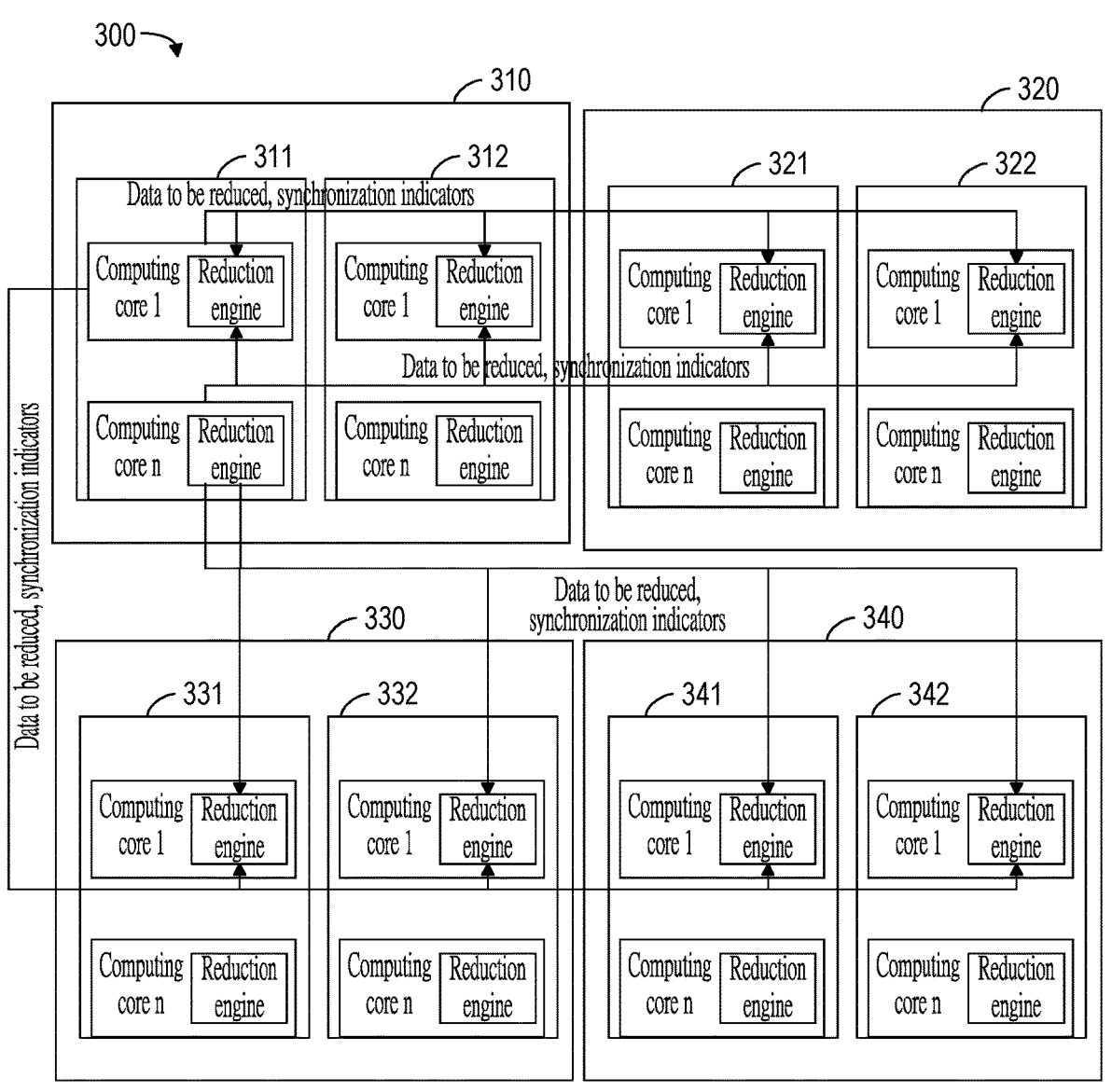
FIG. 3 is a schematic diagram of a data transmission process 300 according to an embodiment of the disclosure.

FIG. 3 illustrates a schematic diagram of a data transmission process according to an embodiment of the disclosure. As shown in FIG. 3, dies 311 and 312 are located in a computing device 310, dies 321 and 322 are located in a computing device 320, dies 331 and 332 are located in a computing device 330, and dies 341 and 342 are located in a computing device 340. The reduction engines in the computing cores 1 in the dies 311, 312, 321, 322, 331, 332, 341, and 342 may all be configured to function as the die reduction engines. It should be understood that this is only an example, and the reduction engines in other computing cores in the dies may be configured to act as the die reduction engines as well, and the scope of the disclosure is not limited herein. It should also be understood that although FIG. 3 shows that only one reduction engine in one die is configured to function as the die reduction engine, this is by way of example only. More than one reduction engines (e.g., the reduction engine in the computing core 1 and the reduction engine in the computing core n) in one die may be configured to act as the die reduction engines. That is, the number of the first reduction engines configured to function as the die reduction engines in one die may be one or more than one, and the scope of the disclosure is not limited herein.

The computing core 1 to the computing core n in the die 311 may be configured to send data to be reduced and synchronization indicators to the 8 reduction engines in the 8 computing cores 1 in the dies 311, 312, 321, 322, 331, 332, 341, and 342. That is, the computing core 1 to the computing core n in the die 311 not only send the data to be reduced and the synchronization indicators to the reduction engine functioning as the die reduction engine in the computing core 1 in the same die 311, but also send the data to be reduced and the synchronization indicators to the reduction engines functioning as the die reduction engines in the computing cores 1 in other dies 312, 321, 322, 331, 332, 341, and 342. It should be noted herein that the computing core 1 in the die 311 where the reduction engine functioning as the die reduction engine is located also sends the data to be reduced and the synchronization indicator to the reduction engine in the computing core 1.

It should be understood that, for the sake of clarity, although FIG. 3 only shows that the computing core 1 and the computing core n in the die 311 send the data to be reduced and the synchronization indicators to the 8 reduction engines in the 8 computing cores 1 in 311, 312, 321, 322, 331, 332, 341, and 342, the transmission of the data to be reduced and the synchronization indicators performed by other computing cores is similar.

Similarly, the computing cores 1 to the computing cores n in the dies 312, 321, 322, 331, 332, 341, and 342 may also be configured to send data to be reduced and the synchronization indicators to the 8 reduction engines in the 8 computing cores 1 in the dies 311, 312, 321, 322, 331, 332, 341, and 342 (not shown).

For each die, in response to receiving the plurality of pieces of data to be reduced and the plurality of synchronization indicators from the plurality of computing cores in the plurality of dies, the first reduction engine in the current die may be configured to perform a reduction operation on the plurality of pieces of data to be reduced to generate a reduction computing result and send synchronization acknowledgments to the plurality of computing cores in the current die.

Figure 4:
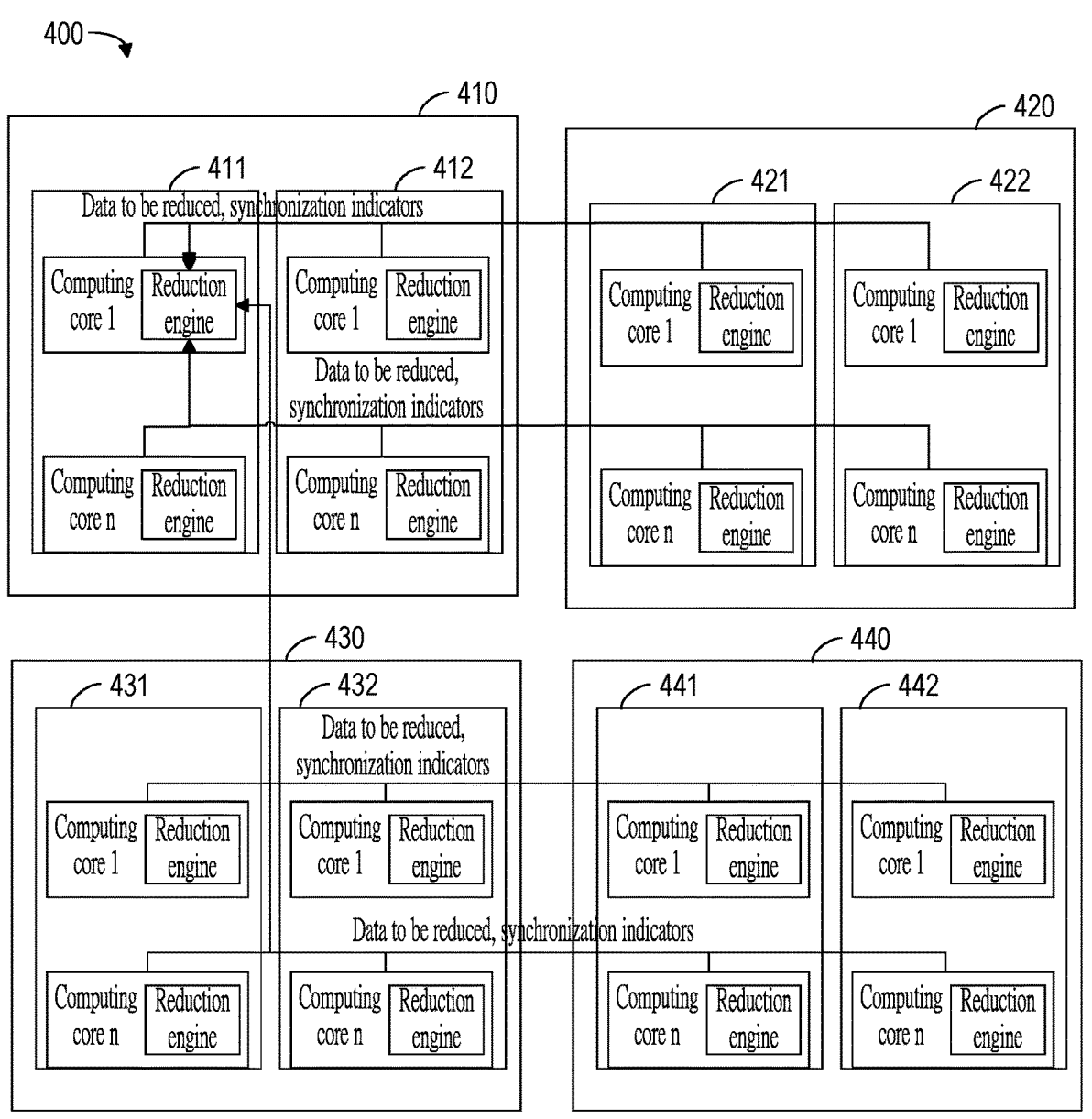
FIG. 4 is a schematic diagram of a data transmission process 400 according to an embodiment of the disclosure.

FIG. 4 illustrates a schematic diagram of a data transmission process according to an embodiment of the disclosure.

As shown in FIG. 4, dies 411 and 412 are located in a computing device 410, dies 421 and 422 are located in a computing device 420, dies 431 and 432 are located in a computing device 430, and dies 441 and 442 are located in a computing device 440. The reduction engines in the computing cores 1 in the dies 411, 412, 421, 422, 431, 432, 441, and 442 may all be configured to function as the die reduction engines. It should be understood that this is only an example, and the reduction engines in other computing cores in the dies may be configured to act as the die reduction engines as well, and the scope of the disclosure is not limited herein. It should also be understood that although FIG. 4 shows that only one reduction engine in one die is configured to function as the die reduction engine, this is by way of example only. More than one reduction engines (e.g., the reduction engine in the computing core 1 and the reduction engine in the computing core n) in one die may be configured to act as the die reduction engines. That is, the number of the first reduction engines configured to function as the die reduction engines in one die may be one or more than one, and the scope of the disclosure is not limited herein.

The reduction engine functioning as the die reduction engine in the computing core 1 in the die 411 may receive a plurality of pieces of data to be reduced (8×n pieces in total) and a plurality of synchronization indicators from the computing cores 1 to the computing cores n in the dies 411, 412, 421, 422, 431, 432, 441, and 442. The reduction engines in the computing cores 1 in the dies 411, 412, 421, 422, 431, 432, 441, and 442 are also similar, and description thereof is thus not repeated herein.

Figure 5:
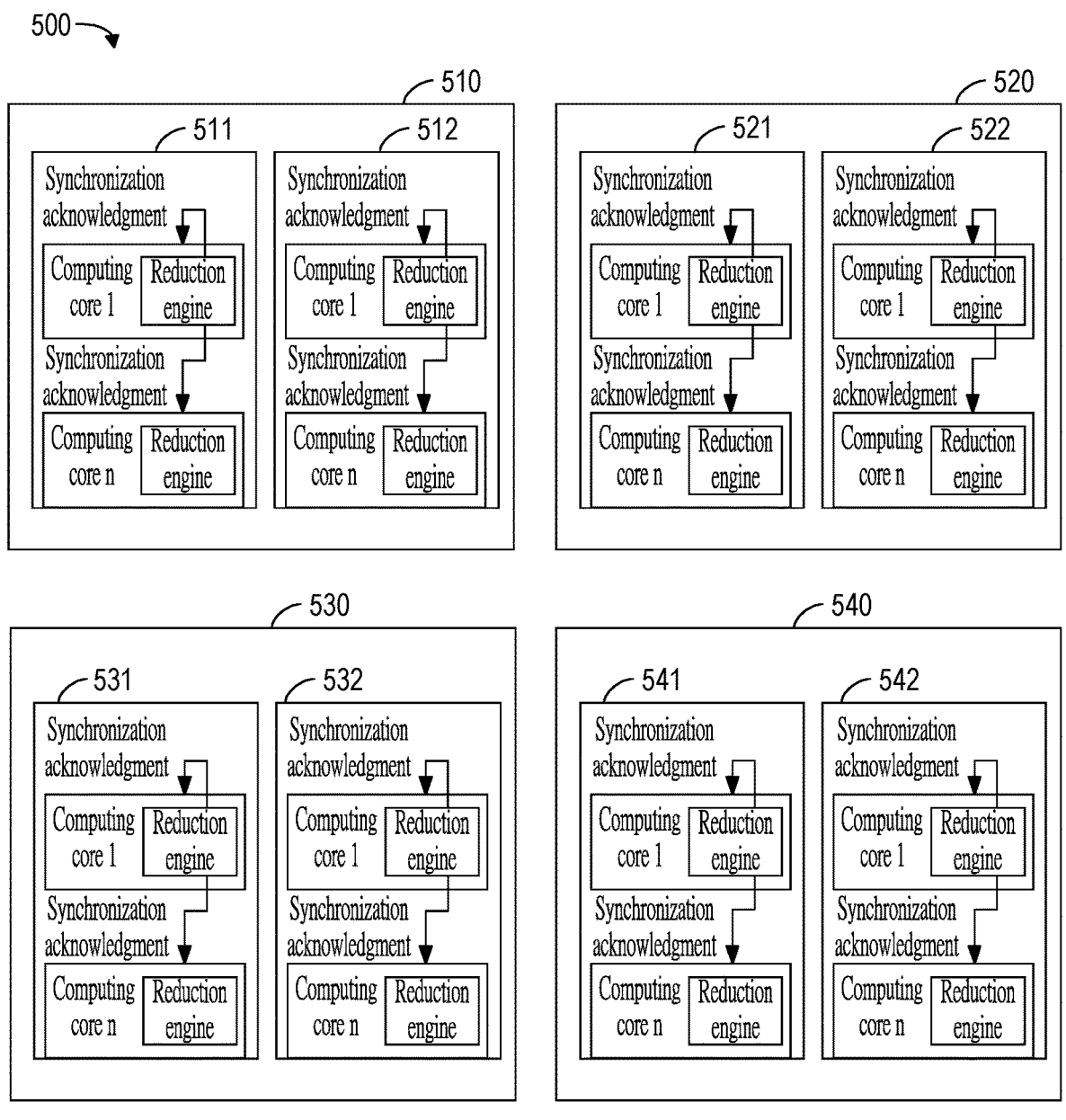
FIG. 5 is a schematic diagram of a data transmission process 500 according to an embodiment of the disclosure.

FIG. 5 illustrates a schematic diagram of a data transmission process according to an embodiment of the disclosure.

As shown in FIG. 5, dies 511 and 512 are located in a computing device 510, dies 521 and 522 are located in a computing device 520, dies 531 and 532 are located in a computing device 530, and dies 541 and 542 are located in a computing device 540. The reduction engines in the computing cores 1 in the dies 511, 512, 521, 522, 531, 532, 541, and 542 may all be configured to function as the die reduction engines. It should be understood that this is only an example, and the reduction engines in other computing cores in the dies may be configured to act as the die reduction engines as well, and the scope of the disclosure is not limited herein. It should also be understood that although FIG. 5 shows that only one reduction engine in one die is configured to function as the die reduction engine, this is by way of example only. More than one reduction engines (e.g., the reduction engine in the computing core 1 and the reduction engine in the computing core n) in one die may be configured to act as the die reduction engines. That is, the number of the first reduction engines configured to function as the die reduction engines in one die may be one or more than one, and the scope of the disclosure is not limited herein.

The reduction engine functioning as the die reduction engine in the computing core 1 in the die 511 may perform a reduction operation on the received multiple pieces of data to be reduced (8×n pieces in total) to generate a reduction computing result and to send synchronization acknowledgments to the computing core 1 to the computing core n in the die 511. That is, the reduction engine functioning as the die reduction engine receives multiple pieces of data to be reduced and multiple synchronization indicators from the multiple computing cores in the local die as well as the remote die, but only sends the synchronization acknowledgments to the multiple computing cores in the local die. This is the specific example of the synchronization and computing of the distributed reduction. The reduction engines in the computing cores 1 in the dies 511, 512, 521, 522, 531, 532, 541, and 542 are also similar, and description thereof is thus not repeated herein.

For each die, in response to receiving the synchronization acknowledgment from the first reduction engine in the current die, each computing core of the plurality of computing cores in the current die is configured to read the reduction computing result from the first reduction engine in the current die.

Figure 6:
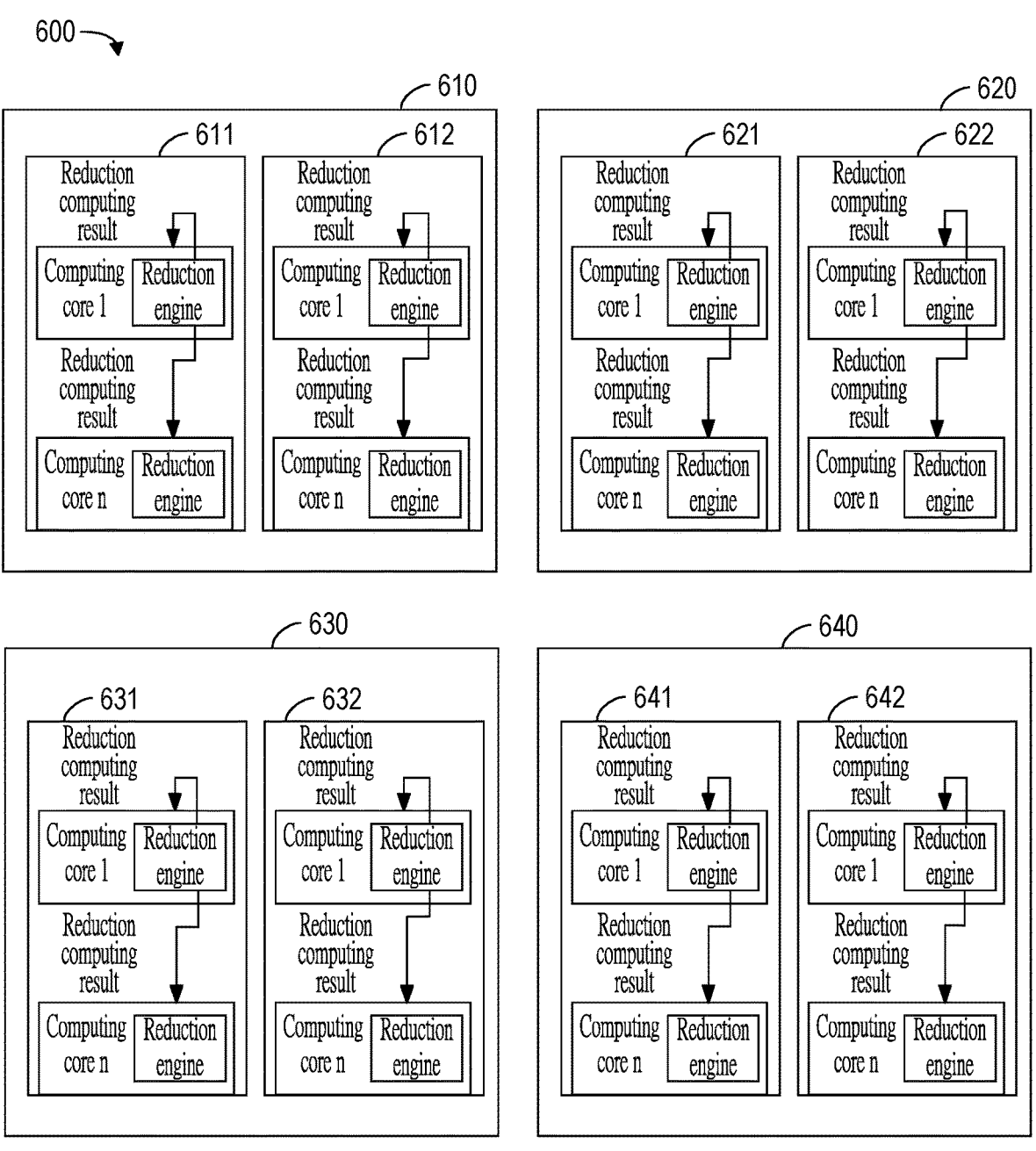
FIG. 6 is a schematic diagram of a data transmission process 600 according to an embodiment of the disclosure.

FIG. 6 illustrates a schematic diagram of a data transmission process according to an embodiment of the disclosure. As shown in FIG. 6, dies 611 and 612 are located in a computing device 610, dies 621 and 622 are located in a computing device 620, dies 631 and 632 are located in a computing device 630, and dies 641 and 642 are located in a computing device 640. The reduction engines in the computing cores 1 in the dies 611, 612, 621, 622, 631, 632, 641, and 642 may all be configured to function as the die reduction engines. It should be understood that this is only an example, and the reduction engines in other computing cores in the dies may be configured to act as the die reduction engines as well, and the scope of the disclosure is not limited herein. It should also be understood that although FIG. 6 shows that only one reduction engine in one die is configured to function as the die reduction engine, this is by way of example only. More than one reduction engines (e.g., the reduction engine in the computing core 1 and the reduction engine in the computing core n) in one die may be configured to act as the die reduction engines. That is, the number of the first reduction engines configured to function as the die reduction engines in one die may be one or more than one, and the scope of the disclosure is not limited herein.

In response to receiving the synchronization acknowledgment from the reduction engine in computing core 1 in the die 611, the computing core 1 to the computing core n in the die 611 may read the reduction computing result from the reduction engine in computing core 1 in the die 611. That is, the multiple computing cores in the die only receive the synchronization acknowledgments and read the reduction computing results from the reduction engine functioning as the die reduction engine in the local die, and do not need to receive the synchronization acknowledgments and read the reduction computing results from the remote die. The delay in obtaining the above information remotely from the remote die is thus saved. The computing cores 1 to the computing cores n in the dies 612, 621, 622, 631, 632, 641, and 642 are also similar, and description thereof is not repeated herein.

Besides, for each die, each computing core of the plurality of computing cores in the current die may further be configured to perform batch normalization on the reduction computing result.

A such, for each die of the plurality of dies, the first reduction engine of the plurality of reduction engines corresponding to the plurality of computing cores in the die is determined to function as the die reduction engine. The plurality of computing cores in the die send the data to be reduced and the synchronization indicators to the plurality of first reduction engines in the plurality of dies. However, the synchronization acknowledgments and the reduction computing results are received and read from the first reduction engine in the local die, and the synchronization acknowledgments and the reduction computing results are not required to be received and read from the remote die. As such, distributed reduction is implemented, and the processing delay of cross-die reduction is significantly reduced. Although each computing core sends multiple pieces of the data to be reduced to different dies or even to different computing devices, this seems to increase data transfer. But since reductions are generally hierarchical, most of the reductions have already been reduced inside each computing core. Therefore, higher-level data transfers to be reduced have been significantly reduced, and generally, it is not a big problem. In addition, the synchronization indicator follows the corresponding data to be reduced, ensuring that by the time synchronization is completed, the reduction operation is completed earlier than the synchronization. Thus, data consistency is thus ensured without the need for a global refreshing command. In the disclosed solution, a reduction of 3 times to 4 times the reduction processing delay across the dies or across the computing devices may be achieved. Therefore, the performance of batch normalization in a deep learning computing system with multiple computing cores, multiple dies, and even multiple computing devices is significantly improved.

FIG. 7 illustrates a flow chart of a data processing method 700 according to an embodiment of the disclosure. For instance, the method 700 may be performed by the computing system 200 as shown in FIG. 1 for each of the plurality of dies. It should be understood that the method 700 may also include additional blocks that are not shown and/or blocks that are shown but may be omitted, and the scope of the disclosure is not limited in this regard.

In block 702, a first reduction engine of a plurality of reduction engines corresponding to a plurality of computing cores included in a current die is determined to function as a die reduction engine.

The first reduction engine may be determined randomly or according to a predetermined rule, for example. The number of the first reduction engine in the current die determined to function as the die reduction engine may be one or more than one.

In block 704, each computing core in the plurality of computing cores sends data to be reduced and a synchronization indicator to the plurality of first reduction engines in the plurality of dies. The synchronization indicator follows the data to be reduced.

The data to be reduced is be used, for example, for batch normalization of a neural network model.

In block 706, in response to receiving the plurality of pieces of data to be reduced and the plurality of synchronization indicators from the plurality of computing cores in the plurality of dies, the first reduction engine in the current die performs a reduction operation on the plurality of pieces of data to be reduced to generate a reduction computing result and sends synchronization acknowledgments to the plurality of computing cores in the current die.

The reduction operation includes but not limited to addition, multiplication, etc., for example.

In block 708, in response to receiving the synchronization acknowledgment from the first reduction engine in the current die, each computing core of the plurality of computing cores in the current die reads the reduction computing result from the first reduction engine in the current die.

Besides, each computing core of the plurality of computing cores in the current die may further perform batch normalization on the reduction computing result.

A such, for each die of the plurality of dies, the first reduction engine of the plurality of reduction engines corresponding to the plurality of computing cores in the die is determined to function as the die reduction engine. The plurality of computing cores in the die send the data to be reduced and the synchronization indicators to the plurality of first reduction engines in the plurality of dies. However, the synchronization acknowledgments and the reduction computing results are received and read from the first reduction engine in the local die, and the synchronization acknowledgments and the reduction computing results are not required to be received and read from the remote die. As such, distributed reduction is implemented, and the processing delay of cross-die reduction is significantly reduced. Although each computing core sends multiple pieces of the data to be reduced to different dies or even to different computing devices, this seems to increase data transfer. But since reductions are generally hierarchical, most of the reductions have already been reduced inside each computing core. Therefore, higher-level data transfers to be reduced have been significantly reduced, and generally, it is not a big problem.

In addition, the synchronization indicator follows the corresponding data to be reduced, ensuring that by the time synchronization is completed, the reduction operation is completed earlier than the synchronization. Thus, data consistency is thus ensured without the need for a global refreshing command. In the disclosed solution, a reduction of 3 times to 4 times the reduction processing delay across the dies or across the computing devices may be achieved. Therefore, the performance of batch normalization in a deep learning computing system with multiple computing cores, multiple dies, and even multiple computing devices is significantly improved.

The disclosure relates to methods, devices, systems, computing apparatuses, computer-readable storage media, and/ or computer program products. A computer program product may include computer readable program instructions for carrying out various aspects of the disclosure.

The computer-readable storage medium may be a tangible device that may hold and store instructions used by an instruction execution device. The computer-readable storage medium may be, for example, but not limited to, an electrical storage device, a magnetic storage device, an optical storage device, an electromagnetic storage device, a semiconductor storage device, or any suitable combination of the foregoing. Specific examples (non-exhaustive list) of the computer-readable storage medium include a portable computer disk, a hard disk, a random access memory (RAM), a read only memory (ROM), an erasable programmable read only memory (EPROM or flash memory), a static random access memory (SRAM), a portable compact disk read-only memory (CD-ROM), a digital versatile disk (DVD), a memory stick, a floppy disk, a mechanical encoding device, a punch card or a raised structure in a groove with instructions stored on it, for example, and any suitable combination of the foregoing. The computer-readable storage medium used herein is not interpreted as a transient signal itself, such as radio waves or other electromagnetic waves which are freely transmitted, electromagnetic waves transmitted through waveguides or other transmission media (e.g., light pulses through fiber optic cables), or electrical signals transmitted through wires.

The computer-readable program instructions described herein may be downloaded from a computer-readable storage medium to various computing/processing devices, or downloaded to an external computer or an external storage device via a network, such as the Internet, a local area network, a wide area network, and/or a wireless network. The network may include copper transmission cables, optical fiber transmission, wireless transmission, routers, firewalls, switches, gateway computers, and/or edge servers. The network adapter card or network interface in each computing/processing device receives computer-readable program instructions from the network and forwards the computer-readable program instructions for storage in the computer-readable storage medium in each computing/processing device.

The computer program instructions used to perform the operations of the disclosure may be assembly instructions, instruction set architecture (ISA) instructions, machine instructions, machine-related instructions, microcodes, firmware instructions, state setting data, or source codes or object codes written in any combination of one or more programming languages. The programming languages include object-oriented programming languages (e.g., Smalltalk, C++, etc.) as well as conventional procedural programming languages (e.g., C language or similar programming languages). The computer-readable program instructions may be executed entirely on a user's computer, partly on the user's computer, as a stand-alone software package, partly on the user's computer and partly on a remote computer, or entirely on the remote computer or a server. In the case of a remote computer, the remote computer may be connected to the user's computer through any kind of network, including a local area network (LAN) or a wide area network (WAN) or may be connected to an external computer (for example, using an Internet service provider to be connected via the Internet). In some embodiments, the status information of computer-readable program instructions may be used to personalize and customize an electronic circuit, such as a programmable logic circuit, a field programmable gate array (FPGA), or a programmable logic array (PLA). The electronic circuit may execute the computer-readable program instructions to realize various aspects of the disclosure.

Herein, various aspects of the disclosure are described with reference to flow charts and/or block views of the method, device (system), and computer program product according to the embodiments of the disclosure. It should be understood that the blocks of the flow charts and/or block views and combinations of blocks in the flow charts and/or block views may be implemented by the computer-readable program instructions.

These computer-readable program instructions may be provided to the processing unit of a general-purpose computer, a special-purpose computer, or other programmable data processing apparatuses to produce a machine. In this way, when these instructions are executed by the central processing unit of a computer or other programmable data processing apparatuses, a device that implements the functions/actions specified in one or more blocks in the flow charts and/or block views is generated. These computer-readable program instructions may also be stored in a computer-readable storage medium, and these instructions cause a computer, a programmable data processing apparatus, and/or other devices to work in a specific manner. As such, the computer-readable medium storing the instructions includes an article of manufacture including instructions for implementing various aspects of the functions/actions specified in one or more blocks in the flow charts and/or block views.

The computer-readable program instructions may also be loaded onto a computer, other programmable data processing apparatuses, or other equipment. In this way, a series of operation steps are executed on the computer, other programmable data processing apparatuses, or other equipment to produce a computer-implemented process. The instructions executed on the computer, other programmable data processing apparatuses, or other equipment may thereby implement the functions/actions specified in one or more blocks in the flow charts and/or block views.

The flow charts and block views in the accompanying drawings show the possible implementation architecture, functions, and operations of the system, method, and computer program product according to the embodiments of the disclosure. In this regard, each block in the flow charts or block views may represent a module, a program segment, or a part of an instruction, and the module, the program segment, or the part of an instruction contains one or more executable instructions for implementing the specified logic function. In some alternative implementations, the functions marked in the blocks may also occur in a different order than the order marked in the drawings. For instance, two consecutive blocks may actually be executed substantially in parallel, or they may sometimes be executed in the reverse order, depending on the functions involved. It should also be noted that each block in the block views and/or flow charts and the combination of the blocks in the block views and/or flow charts may be implemented by a dedicated hardware-based system that performs specified functions or actions, or may be implemented by a combination of dedicated hardware and computer instructions.

Various embodiments of the disclosure have been described above, and the above description is exemplary, not exhaustive, and not limiting of the disclosed embodiments. Numerous modifications and variations will be apparent to a person having ordinary skill in the art without departing from the scope and spirit of the described embodiments. The terminology used herein is chosen to best explain the principles of the embodiments, the practical application or technical improvement over the technology in the marketplace, or to enable a person having ordinary skill in the art to understand the embodiments disclosed herein.

What is claimed is:

1. A data processing method performed in a computing system, wherein the computing system comprises a plurality of chips connected through an inter-chip interconnection technology, each of the chips comprises a plurality of processor dies, each of the processor dies comprises a plurality of computing cores and a plurality of reduction engines, the data processing method comprises:

for each of the processor dies, determining one of the plurality of reduction engines corresponding to the plurality of computing cores comprised in each of the processor dies as a die reduction engine, wherein the die reduction engine is configured to perform a cross-die reduction operation;

performing following steps by a local die, the local die being one of the plurality of processor dies, others of the processor dies being as remote dies:

sending, by each of the computing cores in the local die, data to be reduced and a synchronization indicator to the die reduction engine in the local die and die reduction engines in the remote dies, wherein the synchronization indicator follows the data to be reduced to ensure that by the time synchronization is completed, a reduction operation is completed earlier than a synchronization, thereby ensuring data consistency without a need for a global refreshing command;

in response to receiving a plurality of pieces of data to be reduced and a plurality of synchronization indicators from the plurality of computing cores in the local die and the remote dies, performing, by the die reduction engine in the local die, a reduction operation on the plurality of pieces of data to be reduced to generate a reduction computing result, and only sending, by the die reduction engine in the local die, synchronization acknowledgments to the plurality of computing cores in the local die; and in response to receiving the synchronization acknowledgment from the die reduction engine in the local die and not receiving synchronization acknowledgments from the remote dies, reading, by each of the computing cores in the local die, the reduction computing result from the die reduction engine in the local die.

2. The data processing method according to claim 1, wherein the plurality of pieces of data to be reduced are used for batch normalization of a neural network model.

3. The data processing method according to claim 2, further comprising:

for each of the processor dies, performing following steps:

performing, by each of the computing cores in the local die, the batch normalization on the reduction computing result.

4. The data processing method according to claim 1, wherein a number of the die reduction engine in the local die is one or more than one.

5. A computing system, comprising:

a plurality of chips, connected through an inter-chip interconnection technology;

wherein each of the chips comprises a plurality of processor dies, each of the processor dies comprises a plurality of computing cores and a plurality of reduction engines, for each of the processor dies, one of the plurality of reduction engines corresponding to the plurality of computing cores in each of the processor dies is configured to function as a die reduction engine, wherein the die reduction engine is configured to perform a cross-die reduction operation, one of the plurality of processor dies is used as a local die, others of the processor dies are used as remote dies, each of the computing cores in the local die is configured to send data to be reduced and a synchronization indicator to the die reduction engine in the local die and die reduction engines in the remote dies, wherein the synchronization indicator follows the data to be reduced to ensure that by the time synchronization is completed, a reduction operation is completed earlier than a synchronization, thereby ensuring data consistency without a need for a global refreshing command, in response to receiving a plurality of pieces of data to be reduced and a plurality of synchronization indicators from the plurality of computing cores in the local die and the remote dies, the die reduction engine in the local die is configured to perform a reduction operation on the plurality of pieces of data to be reduced to generate a reduction computing result and only sends synchronization acknowledgments to the plurality of computing cores in the local die, and in response to receiving the synchronization acknowledgment from the die reduction engine in the local die and not receiving synchronization acknowledgments from the remote dies, each of the computing cores in the local die is further configured to read the reduction computing result from the die reduction engine in the local die.

6. The computing system according to claim 5, wherein the plurality of pieces of data to be reduced are used for batch normalization of a neural network model.

7. The computing system according to claim 6, wherein for each of the processor dies, each the computing cores in the local die is further configured to perform batch normalization on the reduction computing result.

8. The computing system according to claim 5, wherein a number of the die reduction engine in the local die is one or more than one.

* * * * *